(12) United States Patent
Kanatsu

(10) Patent No.: US 6,288,761 B1
(45) Date of Patent: Sep. 11, 2001

(54) BACKLIGHT OF LIQUID CRYSTAL DISPLAY HAVING SUBSIDIARY ELECTRO-LUMINESCENCE LAMP

(75) Inventor: Tsutomu Kanatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/351,383

(22) Filed: Jul. 13, 1999

(30) Foreign Application Priority Data

Aug. 4, 1998 (JP) .................................................. 10-220782

(51) Int. Cl.⁷ .................................................. G02F 1/1335
(52) U.S. Cl. .................................. 349/65; 349/68; 349/69; 362/31; 362/84
(58) Field of Search .................................. 349/61, 65, 68, 349/69; 362/31, 84

(56) References Cited

U.S. PATENT DOCUMENTS

| | | | |
|---|---|---|---|
| 5,143,433 | * | 9/1992 | Farrell .................................. 362/29 |
| 5,339,179 | * | 8/1994 | Rudisill et al. ...................... 359/49 |
| 5,396,406 | * | 3/1995 | Ketchpel .............................. 362/27 |
| 5,617,251 | * | 4/1997 | Ohta et al. .......................... 359/599 |
| 5,748,270 | * | 5/1998 | Smith .................................... 349/69 |
| 6,099,134 | * | 8/2000 | Taniguchi et al. ................... 362/31 |
| 6,111,622 | * | 8/2000 | Abileah ................................ 349/61 |

FOREIGN PATENT DOCUMENTS

| | | |
|---|---|---|
| 62-38623 | 3/1987 | (JP) . |
| 62-38624 | 3/1987 | (JP) . |
| 5-223915 | 9/1990 | (JP) . |
| 4-37718 | 2/1992 | (JP) . |
| 8-166589 | 6/1996 | (JP) . |
| 9-230341 | 9/1997 | (JP) . |
| 10-125461 | 5/1998 | (JP) . |

* cited by examiner

Primary Examiner—James A. Dudek
Assistant Examiner—Andrew Schechter
(74) Attorney, Agent, or Firm—Scully, Scott, Murphy & Presser

(57) ABSTRACT

A novel structure for the backlight of an LCD is provided, by which the frame portion of the screen can be further narrowed and the weight of the LCD can be reduced. In the backlight arranged in the display area corresponding to the display section of the LCD, the cold cathode tube, disposed along a part of a circumferential area of the display section, is surrounded by a light-introducing plate made of a light-transmitting material and a reflector, and an electro-luminescence lamp is provided between the display section and the reflector.

5 Claims, 5 Drawing Sheets

BACKLIGHT OF LIQUID CRYSTAL DISPLAY HAVING SUBSIDIARY ELECTRO-LUMINESCENCE LAMP

BACKGROUND OF THE INVENTION

1. Field of the Invention

The present invention relates to the structure of the backlight of an LCD (liquid crystal display), in particular, the structure by which the frame portion of the display section can be narrowed and the device's weight can be reduced.

This application is based on Patent Application No. Hei 10-220782, filed in Japan, the contents of which are incorporated herein by reference.

2. Description of the Related Art

The LCD, used as a display device, is mounted in a variety of electronic devices. A laptop (or notebook) personal computer is a typical electronic device employing a large-size liquid display screen. In recent laptop personal computers, the main screen size has been standardized to "A4 size" or "B5 size", and there is competition to develop thinner and lighter screens at these standard sizes. Development is being carried out to increase the area of the LCD itself within the limited main screen size. In order to increase the area of the LCD, it is important to determine how the outer edge of the LCD screen, that is, the frame portion of the main screen, can be narrowed.

FIG. 4 is a general perspective view showing the backlight portion of a conventional transmission-type LCD, and FIG. 5 is a sectional view thereof.

As shown in FIGS. 4 and 5, the backlight of such a conventional transmission-type LCD generally comprises light-introducing plate 23 for introducing light, input from an end face the plate, in a manner such that the LCD panel is irradiated by the light, cold cathode tube 26 for radiating light towards the inside of the light-introducing plate 23; reflector 27 for effectively reflecting the light radiated from the cold cathode tube 26 so as to direct the reflected light towards the end face of the light-introducing plate 23; diffusion plate 30, disposed on the upper face of the light-introducing plate 23, for diffusing the light (introduced from the light-introducing plate 23) towards the outside; and reflection plate 25, attached to the bottom face of the light-introducing plate 23, for reflecting the light transmitted through the light-introducing plate 23 so as to direct the reflected light towards the front face. Reference numeral 21 indicates an LCD panel, and reference numeral 22 indicates a display section.

In the above structure, lower-voltage electrode 26b and higher-voltage electrode 26a are provided at both ends of the cold cathode tube 26, and the lower-voltage electrode 26b is connected with connection (wiring) line 31. In order to easily connect the cold cathode tube 26 with an electric source, the connection line 31 is extended to the connection point of the higher-voltage electrode 26a and such an arrangement prevents the narrowing of the screen frame.

In order to make the LCD thin and to make the screen frame narrow in the above structure of the backlight, Japanese Unexamined Patent Application, First Publication, No. Hei 9-230341 discloses an arrangement (shown in FIG. 6) in which a sheet-type connection line 31 is adopted and is disposed on the upper face of the light-introducing plate 23, thereby reducing the size and weight of the device.

However, in the above structure, if the cold cathode tube 26 and reflector 27 are disposed in the display area corresponding to the display section 22 of LCD panel 21, the upper portion of the reflector 27 is not irradiated, so that the cold cathode tube 26 and reflector 27 must be disposed outside the above display area. Therefore, it is difficult to further narrow the frame of the LCD.

SUMMARY OF THE INVENTION

In consideration of the above circumstances, an objective of the present invention is to provide a novel structure for the backlight of an LCD, by which the frame portion of the screen can be further narrowed and the weight of the LCD can be reduced.

Therefore, the present invention provides a backlight of a liquid crystal display, arranged in the display area corresponding to a display section of the liquid crystal display in a manner such that the backlight partially overlaps the display area, the backlight comprising:

a cold cathode tube which is disposed along a part of a circumferential area of the display section;

a light-introducing plate made of a light-transmitting material, an end face of which faces the cold cathode tube;

a reflector for surrounding the cold cathode tube and reflecting light radiated from the cold cathode tube; and an electro-luminescence lamp provided between the display section and the reflector, so as to radiate a part of the display section which cannot be irradiated via the light-introducing plate.

According to the above structure, the cold cathode tube and the and the reflector are arranged in the display area corresponding to the display section, and the electro-luminescence lamp is provided between the display section and the reflector. Therefore, a part of the display section which cannot be irradiated using the cold cathode tube can be irradiated by the electro-luminescence lamp; thus, the frame portion of the LCD can be much narrower in comparison with conventional LCDs. In addition, the light-introducing plate can be smaller, thereby reducing the weight of the LCD.

Preferably, the electro-luminescence lamp is arranged in a manner such that the electro-luminescence lamp overlaps the whole circumference area of the display section. Accordingly, it is possible to prevent this circumference area from getting dark and the brightness of the LCD can further be more uniform.

The backlight may comprise a first diffusion plate, disposed above the light-introducing plate, for diffusing light incident from the light-introducing plate.

The backlight may further comprise a second diffusion plate for diffusing light, which is arranged in a manner such that the whole area of the first diffusion plate and the electro-luminescence lamp is covered with the second diffusion plate.

In the above structure, a dot pattern may be formed at the lower face side of the light-introducing plate so as to diffuse and reflect light introduced to said lower face side.

DESCRIPTION OF THE PREFERRED EMBODIMENTS

Hereinafter, embodiments of the present invention will be explained with reference to the drawings. However, the present invention is not limited to the embodiments.

Figure 1:
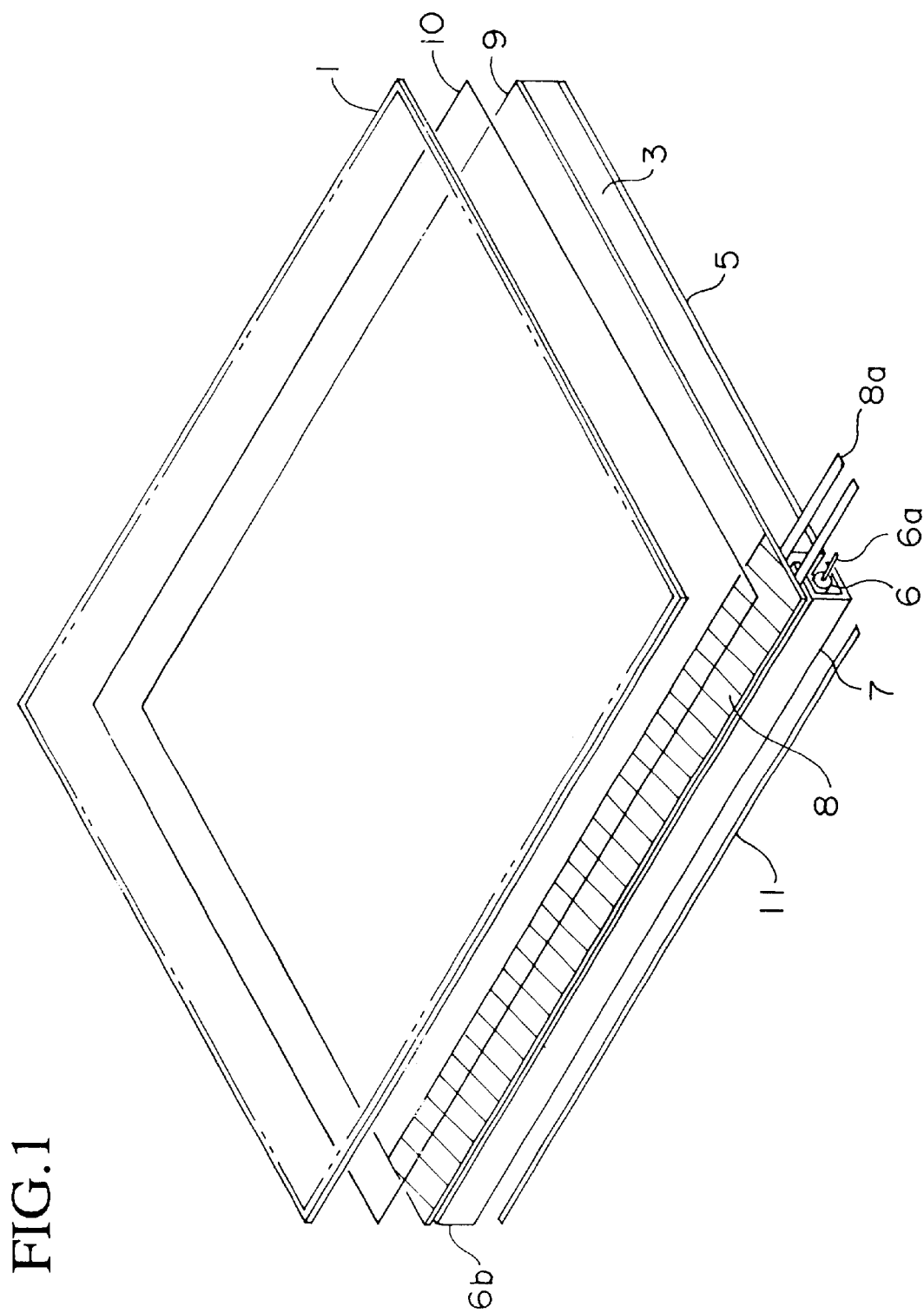
FIG. 1 is a general perspective view of the LCD of the first embodiment according to the present invention.
Figure 2:
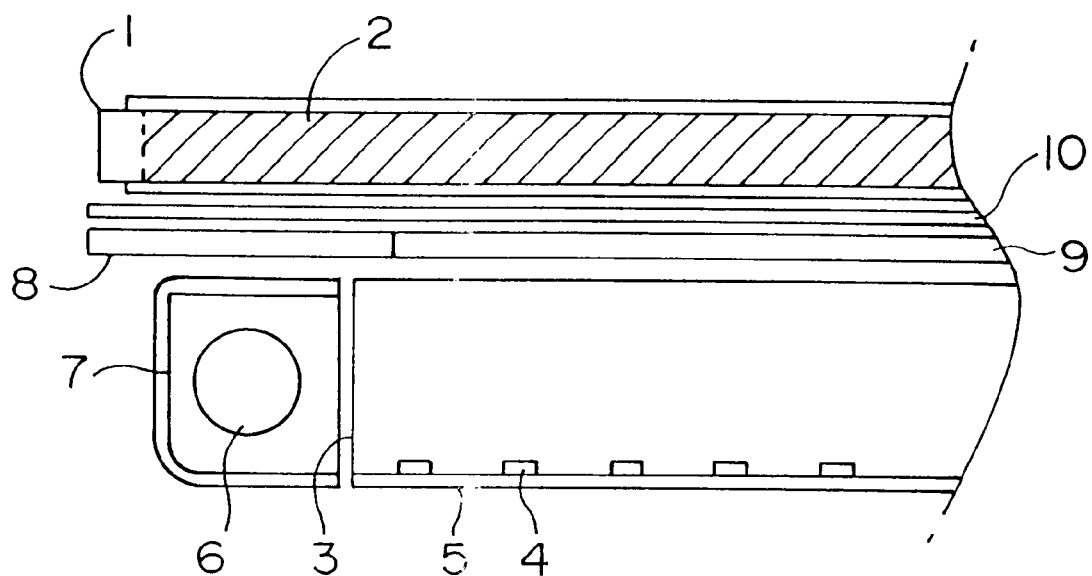
FIG. 2 is a sectional view of the LCD of FIG. 1.

FIG. 1 is a general perspective view of the LCD of the first embodiment, and FIG. 2 is a sectional view of it.

This LCD comprises LCD panel 1, display section 2, light-introducing plate 3, dot pattern 4, reflection plate 5, cold cathode tube 6, reflector 7, electro-luminescence lamp (abbreviated as "EL lamp", hereinafter) 8, diffusion plates 9 and 10, and connection (wiring) line 11. These are basic components.

As shown in FIGS. 1 and 2, light is incident from the cold cathode tube 6, on the end face (of the light-introducing plate) which faces the cold cathode tube 6, and the incident light is introduced via the light-introducing plate 3 towards the LCD panel 1. The light-introducing plate 3 is made of a light-transmitting resin such as an acrylic resin. The dot pattern 4 is formed (by using a white paint) at the lower face side of the light-introducing plate 3, as shown in FIG. 2, so as to diffuse and reflect the light introduced to the lower face side of the light-introducing plate 3. In addition, reflection plate 5 is provided on the lower face of the light-introducing plate 3 so that the light transmitted through the light-introducing plate 3 is reflected towards the upper face of the light-introducing plate 3.

The cold cathode tube 6 radiates light towards the inside of the light-introducing plate 3. The reflector 7 having a U-shaped sectional view is arranged in a manner such that the cold cathode tube 6 is surrounded by the reflector 7, so as to effectively reflect the light, radiated from the cold cathode tube 6, towards the relevant end face of the light-introducing plate 3. The cold cathode tube 6 and the reflector 7 are arranged in the display area corresponding to the display section 2 of LCD panel 1, as shown in FIG. 2.

As the reflector 7 is arranged in the display area, a part of display section 2 is not irradiated by light from the light-introducing plate 3. However, this portion is irradiated using EL lamp 8. As shown in FIG. 2, the EL lamp 8 having a flat shape is disposed at the upper side of the reflector 7, between the LCD panel 1 and reflector 7, so as to radiate a part (of display section 2 of LCD panel 1) which cannot be irradiated by the cold cathode tube 6. Here, as shown in FIG. 2, the EL lamp 8 slightly overlaps the upper area of the light-introducing plate 3 so that non-uniform brightness occurring near the cold cathode tube 6 can be prevented or reduced.

The diffusion plate 9 is disposed at the upper side of the light-introducing plate 3 so as to diffuse the light (incident from the light-introducing plate 3) towards the outside. This diffusion plate 9 has another function of harmonizing the color of light of the whole area with the color of EL lamp 8.

The diffusion plate 10 is arranged such that the EL lamp 8 and the diffusion plate 9 are wholly covered by plate 10. Such an arrangement prevents non-uniform light near the joint line of the EL lamp 8 and the diffusion plate 9.

In addition, lower-voltage electrode 6b and higher-voltage electrode 6a are provided at both ends of the cold cathode tube 6, and the lower-voltage electrode 6b is connected with connection (wiring) line 11. In order to easily connect the cold cathode tube 6 with an electric source (not shown), the connection line 11 is extended to the connection point of the higher-voltage electrode 6a.

Here, terminal 8a of the EL lamp 8 is projected at the connection side of the higher-voltage electrode 6a so that the connection with the electric source can be easily performed.

Hereinbelow, the operations of the LCD of the present embodiment will be explained with reference to FIGS. 1 and 2.

First, the cold cathode tube 6 and the EL lamp 8, that is, light sources in this embodiment, are radiated. The light radiated from the cold cathode tube 6 is incident on the relevant end face of the light-introducing plate 3, directly or after being reflected by the reflector 7. The light input into the light-introducing plate 3 repeats total reflection and then is radiated from the upper face of the plate 3 to the outside. In addition, the light advancing towards the lower face side of the light-introducing plate 3 is reflected by dot pattern 4 (formed in the light-introducing plate 3) and reflection plate 5 towards the upper face side. The light radiated from the upper face of the light-introducing plate 3 is diffused by the diffusion plate 9. Here, light output from the diffusion plate 9 has uniform brightness and thus functions as an uniform plane light source, and color harmonization with the EL lamp 8 is realized. Uniform brightness is also observed at the joint portion of the diffusion plate 9 and the EL lamp 8, and thus the whole display screen has further uniform brightness.

As explained above, the present embodiment employs the EL lamp 8; thus, the cold cathode tube 6 and the reflector 7 can be arranged in the display area corresponding to the display section 2 of LCD panel 1. Therefore, the frame of the LCD can be narrowed. In addition, the light-introducing plate 3 can also be smaller; thus, another advantage such as reducing of the device's weight can also be obtained.

Also as explained above, the EL lamp 8 has a compensating function of radiating a part which cannot be irradiated by the light-introducing plate 3. Such a part is produced by arranging the cold cathode tube 6 and the reflector 7 in the display area corresponding to the display section 2 of the LCD panel 1. In addition, non-uniform brightness of an area (of the light-introducing plate 3) near the cold cathode tube 6 can be prevented by the EL lamp 8.

The technical application field of the present invention is not limited to the above embodiment, but a variety of modifications are possible within the scope of the present invention.

Figure 3:
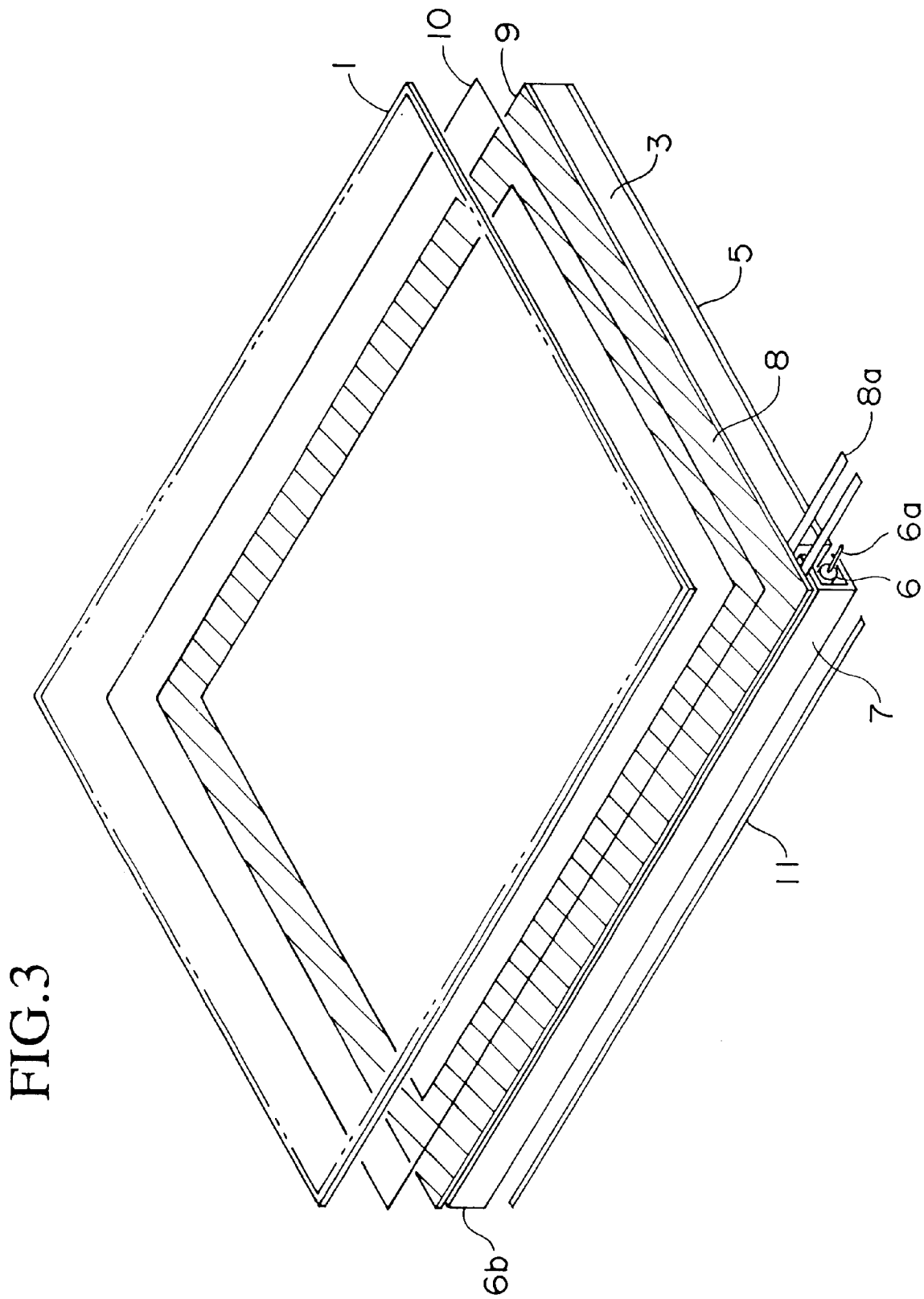
FIG. 3 is a general perspective view of the LCD of the second embodiment according to the present invention.
Figure 4:
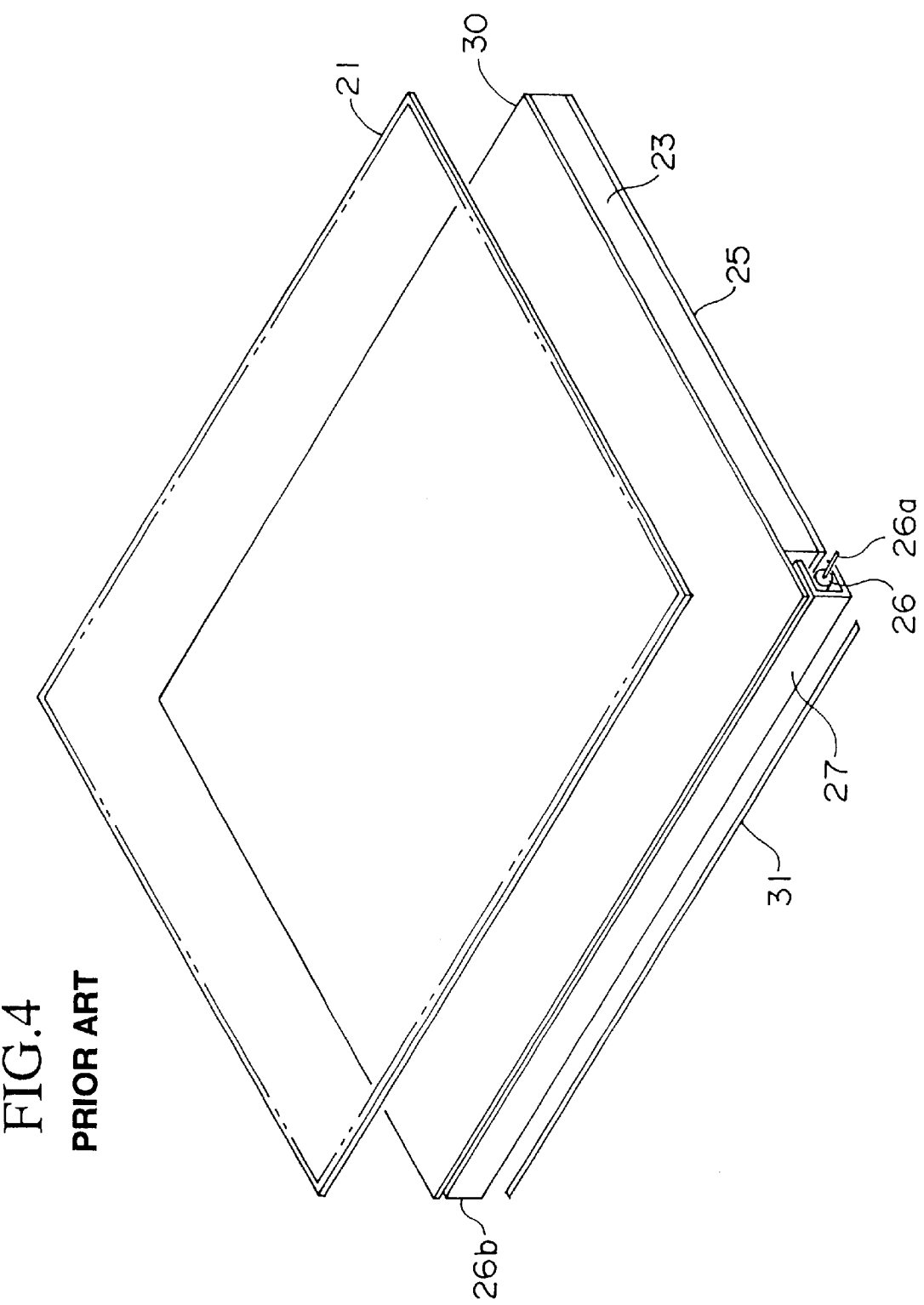
FIG. 4 is a general perspective view showing the backlight portion of a conventional transmission-type LCD.
Figure 5:
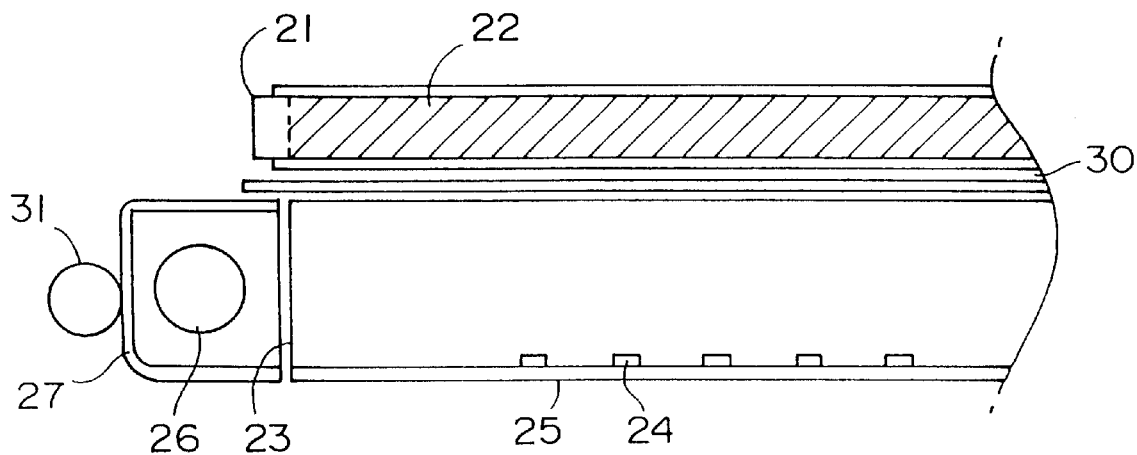
FIG. 5 is a sectional view of the LCD of FIG. 4.
Figure 6:
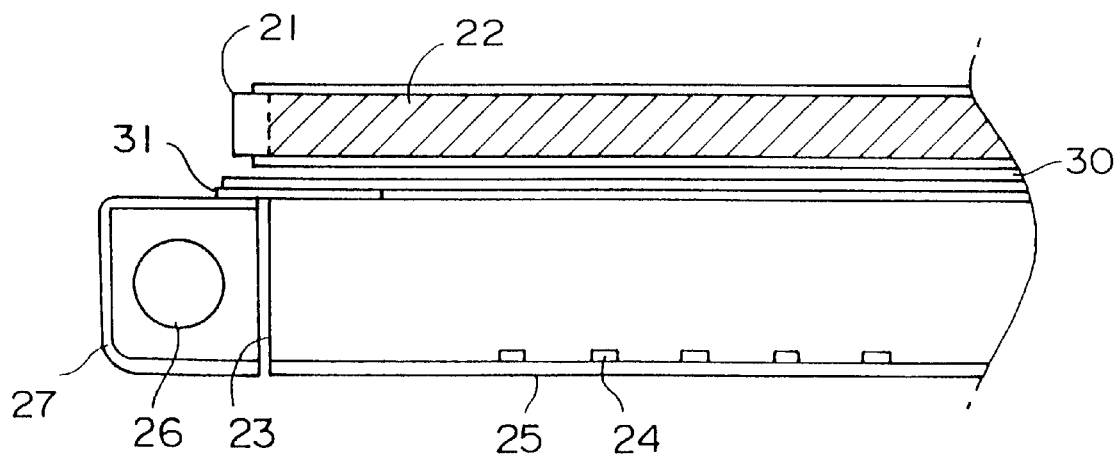
FIG. 6 is a sectional view of the LCD, for explaining the connection wiring arrangement disclosed in Japanese Unexamined Patent Application, First Publication, No. Hei 9-230341.

FIG. 3 is a general perspective view of the LCD of the second embodiment. In the second embodiment, only the shape of the EL lamp 8 is different from that in the first embodiment. Other parts are identical those in the first embodiments, thus explanations thereof are omitted here.

In the first embodiment, the EL lamp is arranged only at the upper side of the cold cathode tube 6; however, in the second embodiment, the EL lamp 8 is arranged in a manner such that the circumferential area of the light-introducing plate 3 is covered by the EL lamp, as shown in FIG. 3. Accordingly, the frame-narrowing and device-lightening effects can be further improved in the present LCD. In addition, the EL lamp 8 radiates the circumferential area of the light-introducing plate 3 in this case; thus, this area does not become dark and the brightness of the LCD can further be more uniform.

What is claimed is:

1. A backlight of a liquid crystal display, arranged in the display area corresponding to a display section of the liquid crystal display in a manner such that the backlight partially overlaps the display area, the backlight comprising:

a cold cathode tube which is disposed along a part of a circumferential area of the display section;

a light-introducing plate made of a light-transmitting material, an end face of which faces the cold cathode tube;

a reflector for surrounding the cold cathode tube and reflecting light radiated from the cold cathode tube; and an electro-luminescence lamp provided between the display section and the reflector, so as to radiate a part of the display section which cannot be irradiated via the light-introducing plate.

2. A backlight of a liquid crystal display as claimed in claim 1, wherein the electro-luminescence lamp is arranged in a manner such that the electro-luminescence lamp overlaps the whole circumference area of the display section.

3. A backlight of a liquid crystal display as claimed in claim 1, further comprising a first diffusion plate, disposed above the light-introducing plate, for diffusing light incident from the light-introducing plate.

4. A backlight of a liquid crystal display as claimed in claim 3, further comprising a second diffusion plate for diffusing light, which is arranged in a manner such that the whole area of the first diffusion plate and the electro-luminescence lamp is covered with the second diffusion plate.

5. A backlight of a liquid crystal display as claimed in claim 1, wherein a dot pattern is formed at the lower face side of the light-introducing plate so as to diffuse and reflect light introduced to said lower face side.

* * * * *

UNITED STATES PATENT AND TRADEMARK OFFICE
CERTIFICATE OF CORRECTION

PATENT NO. : 6,288,761 B1
DATED : September 11, 2001
INVENTOR(S) : T. Kanatsu

It is certified that error appears in the above-identified patent and that said Letters Patent is hereby corrected as shown below:

<u>Title page,</u>
Item [56], References Cited, U.S. PATENT DOCUMENTS, "5-223915" should read -- 2-223915 --

Signed and Sealed this

Eighteenth Day of June, 2002

Attest:

Attesting Officer

JAMES E. ROGAN
*Director of the United States Patent and Trademark Office*